United States Patent [19]

Vanderhider et al.

[11] 4,269,945
[45] May 26, 1981

[54] REACTION INJECTION MOLDED POLYURETHANES EMPLOYING ALIPHATIC AMINE CHAIN EXTENDERS

[75] Inventors: James A. Vanderhider, Lake Jackson; Gerald M. Lancaster, Surfside, both of Tex.

[73] Assignee: The Dow Chemical Company, Midland, Mich.

[21] Appl. No.: 114,803

[22] Filed: Jan. 24, 1980

[51] Int. Cl.³ .............................................. C08G 18/14
[52] U.S. Cl. .................................... 521/159; 521/163; 521/167; 521/176
[58] Field of Search ............... 521/159, 167, 163, 176; 528/60, 61, 64, 65, 66, 76, 77

[56] References Cited

U.S. PATENT DOCUMENTS

| | | | |
|---|---|---|---|
| 3,155,657 | 11/1964 | Bedoit | 260/247 |
| 3,155,728 | 11/1964 | Lesesne | 260/584 |
| 3,161,682 | 12/1964 | Lesesne | 260/584 |
| 3,179,606 | 4/1965 | Prescott et al. | 521/164 |
| 3,231,619 | 1/1965 | Spermanya | 260/584 |
| 3,236,895 | 2/1966 | Lee et al. | 260/584 |
| 3,267,050 | 8/1966 | Kuryla et al. | 521/164 |
| 3,436,359 | 4/1969 | Hubin et al. | 260/2 |
| 3,558,529 | 1/1971 | Whitman et al. | 521/164 |
| 3,654,370 | 4/1972 | Yeakey | 260/584 |
| 3,660,319 | 5/1972 | Yeakey | 521/164 |
| 3,666,788 | 5/1972 | Rowton | 260/29.2 TN |
| 3,668,173 | 6/1972 | Wooster et al. | 260/32.6 N |
| 3,684,770 | 8/1972 | Meisert et al. | 8/115.6 |
| 3,714,128 | 1/1973 | Rowton et al. | 260/465.5 R |
| 3,838,076 | 9/1974 | Moss et al. | 521/164 |
| 3,847,992 | 11/1974 | Moss et al. | 260/584 B |
| 4,048,105 | 9/1977 | Salisbury | 521/164 |
| 4,049,636 | 9/1977 | Mao et al. | 528/76 |
| 4,070,530 | 1/1978 | Hobbs | 526/7 |
| 4,102,833 | 7/1978 | Salisbury | 521/159 |
| 4,107,106 | 8/1978 | Dunleavy et al. | 521/164 |
| 4,133,943 | 1/1979 | Blahak et al. | 521/163 |

FOREIGN PATENT DOCUMENTS 784293 4/1968 Canada.
863223 2/1971 Canada.
1534258 11/1978 United Kingdom.

OTHER PUBLICATIONS

Ludwico et al., "The Bayflex 110 Series", Society of Automotive Engineers Passenger Car Meeting, Detroit, Sep. 26–30, 1977.
Gerkin et al., "The Properties of High Modules RIM Urethanes", Soc. Automotive Engr Passenger Car Meeting Detroit, Sep. 26–30, 1977.
Bonart, J. Macromol. Sci.-Phys, B2(1), Mar., 1968, pp. 115–138.
Wilkes et al., J. Macromol. Sci-Phys., B7(1), 1973, pp. 157–175.
Wischmann et al., J. Elastomers & Plastics, vol. 9, Jul., 1977, pp. 299–311.
Rowton, J. Elastomers & Plastics, vol. 9, Oct., 1977, pp. 365–375.

Primary Examiner—Maurice J. Welsh
Attorney, Agent, or Firm—J. G. Carter

[57] ABSTRACT

Reaction injection molded polyurethanes are prepared employing a mixture of chain extenders, at least one of which is a hydroxyl-containing compound free of aliphatic amine hydrogen atoms such as, for example, ethylene glycol, or an aromatic amine hydrogen-containing compound which is free of aliphatic amine and at least one of which is an aliphatic amine-containing compound which contains at least one primary amine group such as an aminated polyoxypropylene glycol.

5 Claims, No Drawings

REACTION INJECTION MOLDED POLYURETHANES EMPLOYING ALIPHATIC AMINE CHAIN EXTENDERS

BACKGROUND OF THE INVENTION

Reaction injection molded polyurethanes are well known in the art as described in a paper entitled "THE BAYFLEX 110 SERIES—THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Mich., Sept. 26–30, 1977; a paper entitled "THE PROPERTIES OF HIGH MODULUS RIM URETHANES", by R. M. Gerkin and F. E. Critchfield presented at the above meeting; British patent No. 1,534,258 titled "PROCESS FOR THE PRODUCTION OF ELASTOMERIC POLYURETHANE-POLYUREA MOULDED PRODUCTS HAVING A COMPACT SURFACE SKIN" and a book by F. Melvin Sweeney entitled INTRODUCTION TO REACTION INJECTION MOLDING, Technomics, Inc., 1979.

These systems employ, as chain extenders, diols, aromatic amines, cyanoethylated polyoxyalkylene amines and mixtures thereof.

It has been thought that as a general rule the aliphatic amines are too fast to be suitably employed in RIM urethane applications. It has now been discovered that certain quantities of aliphatic amines enhance certain properties such as one or more of those selected from, for example, flexural modulus, impact strength, tear strength, heat resistance and the like can be improved by their use in such RIM urethane systems usually without an unacceptable reduction in other properties of the polymer.

SUMMARY OF THE INVENTION

The present invention pertains to an improvement in RIM urethane systems which systems employ a composition which comprises (A) a relatively high molecular weight hydroxyl-containing polyol, (B) a chain extender and (C) a polyisocyanate, polyisothiocyanate or mixture thereof; the improvement residing in the use of, as the chain extender, a mixture comprising (1) at least one member selected from the group consisting of (a) hydroxyl-containing materials free of aliphatic amine hydrogen atoms, which have the average OH functionality of from about 2 to about 4, preferably from about 2 to about 3 and most preferably about 2 and an average OH equivalent weight of from about 30 to about 120, preferably from about 30 to about 70 and most preferably from about 30 to about 50 and (b) an aromatic amine-containing compound which is essentially free of aliphatic amine hydrogens and which contains at least 2 aromatic amine hydrogen atoms and (2) at least one aliphatic amine-containing material having at least one primary amine group, an average aliphatic amine hydrogen functionality of from about 2 to about 16, preferably from about 2 to about 12 and most preferably from about 4 to about 8 and an average aliphatic amine hydrogen equivalent weight of from about 15 to about 500, preferably from about 50 to about 200 and most preferably from about 80 to about 150 and wherein components A, B and C are present in quantities such that the weight percent of the theoretical reaction product of the amine hydrogen atoms of component (B2) with a stiochiometric quantity (one NCO or NCS group for each aliphatic amine hydrogen) of component (C) based upon the total weight of components (A), (B) and (C) is from about 5 to about 25, preferably from about 6 to about 20 and most preferably from about 6 to about 16; and wherein the NCX index is from about 0.6 to about 1.5, preferably from about 0.7 to about 1.25 and most preferably from about 0.8 to about 1.10 with the proviso that when the system contains an NCX trimerization catalyst, the NCX index can be as high as 5.

The term NCX index is the ratio of the total number of NCO and/or NCS groups to the total number of active hydrogen atoms contained in the formulation.

DETAILED DESCRIPTION OF THE PREFERRED EMBODIMENTS

The relatively high molecular weight hydroxyl-containing polyols which can be employed herein are those polyether and polyester polyols which are free of active amine hydrogen atoms and which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(-methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other polyols which can be employed herein include polymer-containing polyols such as, for example, those disclosed in U.S. Pat. Nos. RE 29,118 (Stamberger), RE 28,715 (Stamberger), RE 29,014 (Pizzini et al) and 3,869,413 (Blankenship et al) all of which are incorporated herein by reference.

Suitable hydroxyl-containing chain extenders which are free of aliphatic amine hydrogen atoms include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

Suitable aliphatic amine-containing chain extenders having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis(p-aminocyclohexyl)methane, triethylenetetramine, tetraethylenepentamine, mixtures thereof and the like.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a chain extender which is essentially free of aliphatic amine hydrogen atoms include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenlylmethane, 4,4'-diaminodiphenylmethane, naphthalene-1,5-diamine, triphenylmethane-4,4',4"triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethany, 4,4'-methylene-bis(2,6-diisopropylaniline), mixtures thereof and the like.

Suitable polyisocyanates include the organic aromatic and aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable are organic aromatic polyisocyanates and the prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, mixtures thereof and the like.

Also suitable are the corresponding polyisothiocyanates.

The polyurethanes can be prepared either in the presence or absence of a catalyst. Those polyurethanes prepared from amine containing polyols do not usually require a catalyst although catalysts can be employed if desired. On the other hand, those polyurethanes prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis(2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No. 4,126,741 (Carleton et al) all of which are incorporated herein by reference.

The zwitterions can also function as a catalyst for urethane formation i.e. the NCX—OH reaction.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from Union Carbide Corp.; and B-1048 commercially available from P. H. Goldschmidt, AG., mixtures thereof and the like.

The polyurethanes of the present invention may additionally contain, if desired, coloring agents, mold release agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) or ¼ inch (0.64 cm) and the like. Other particularly suitable fillers are mica, wollastonite, and the like.

The components which react to form the polyurethanes of the present invention can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for the RIM applications of the present invention include those disclosed in the aforementioned articles by Ludwico et al, Gerkin et al, British patent No. 1,534,258 and the book by F. Melvin Sweeney all of which are incorporated herein by reference.

To prevent the solidifying mass from adhering to the mold surface, it may be necessary to precoat the mold surface with a film of a suitable mold release agent such as, for example, hydrocarbon wax or a polysiloxane preparation or a polytetrafluoroethylene coating, or employ an internal mold release agent in the composition.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

Following is a list of materials employed in the examples and comparative experiments.

Polyol A is the reaction product of glycerine and propylene oxide at a molar ratio of about 1 to 6 respectively and having an equivalent weight of about 150.

Polyol B is the reaction product of Polyol A with propylene oxide and subsequently end-capped with about 8% by weight of ethylene oxide to a hydroxyl equivalent weight of about 1000.

Polyol C is the reaction product of Polyol A with propylene oxide and subsequently end-capped with ethylene oxide. The amount of ethylene oxide is about 17% by weight of the total amount of oxide added. The hydroxyl equivalent weight is about 2361.

Polyol D is the reaction product of glycerine with propylene oxide subsequently end-capped with about 15 wt. % ethylene oxide. The hydroxyl equivalent weight is about 1567.

Polyol E is a polyether triol containing about 30% by weight of polyacrylonitrile. This copolymer polyol has an average hydroxyl equivalent weight of about 2045 and is commercially available from Union Carbide Corporation as NIAX 3123.

Polyol F is polyether polyol D containing about 21% by weight of a copolymer consisting of 80% acrylonitrile and 20% by weight of styrene. The product has an average hydroxyl equivalent weight of about 1800.

Chain Extender A is ethylene glycol having an average OH equivalent weight of about 31.

Chain Extender B is diethylene glycol having an average OH equivalent weight of about 53.

Chain Extender C is ethylene diamine having an average amine hydrogen equivalent weight of about 15.

Chain Extender D is dipropylene glycol having an average hydroxyl equivalent weight of about 67.

Chain Extender E is diethylenetriamine having an average amine hydrogen equivalent weight of about 21.

Chain Extender F is the reaction product of trimethylolpropane with propylene oxide containing terminal amine groups represented by the formula

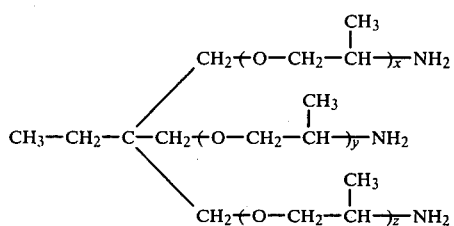

wherein $x+y+z$ has a value of about 5.3. The average amine hydrogen equivalent weight is about 67 and the product is commercially available from Jefferson Chemical Co. as JEFFAMINE T-403.

Chain Extender G is an aminated polyoxypropylene glycol represented by the formula

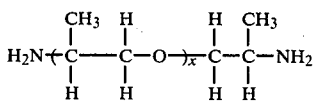

wherein x has a value of about 5.6. This product has an average amine hydrogen equivalent weight of about 100 and is commercially available from Jefferson Chemical Co. as JEFFAMINE D-400.

Chain Extender H is an aminated polyoxyalkylene glycol represented by the same formula as in G above wherein x has an average value of about 2.6. This product has an average amine hydrogen equivalent weight of about 57.5 and is commercially available from Jefferson Chemical Co. as JEFFAMINE D-230.

Chain Extender I is bis(p-aminocyclohexyl)methane having an average amine hydrogen equivalent weight of about 52.5.

Chain Extender J is a mixture of 94.95% aminoethylpiperazine, 4.05% chain extender E and 1% impurities having an average functionality of about 3.04 and an average amine hydrogen equivalent weight of about 41.4.

Chain Extender K is a polymethylene polyphenyl amine having an average amine active hydrogen functionality of about 4.6 and an average amine hydrogen equivalent weight of about 51.5 and is commercially available from Upjohn Co. as CURETHANE 103.

CHAIN EXTENDER L is a polymethylene polyphenylamine having an average amine hydrogen functionality of about 6 and an average amine hydrogen equivalent weight of about 51.5 and is commercially available from E. I. duPont deNemours and Co., Inc.

Polyisocyanate A is a liquid, modified diphenylmethane diisocyanate containing a high percentage of pure diphenyl methane diisocyanate and a lesser amount of polycarbodiimide adducts commercially available from The Upjohn Company as ISONATE 143L. The average NCO equivalent weight is about 143.

Polyisocyanate B is a liquid, modified polyisocyanate prepolymer having a percent NCO of about 26.4 and an NCO equivalent weight of about 159 which is commercially available from Mobay Chemical Company as Mondur E-509.

Polyisocyanate C is a liquid, modified polyisocyanate having an NCO content of 22.6%±0.6% and an NCO equivalent weight of about 185 which is commercially available from Mobay Chemical Company as Mondur PF.

Catalyst A is FOMREZ UL-28 commercially available from Witco Chemical Co.

Catalyst B is a liquid lead complex containing 36% lead, commercially available from Tenneco Corporation as Nuodex.

The following examples are illustrative of the invention but are not to be construed as to limiting the scope thereof in any manner.

The physical properties were determined by the following methods.

| PROPERTY | UNITS | TEST METHOD |
|---|---|---|
| Flexural Modulus | psi(kg/cm$^2$) | ASTM D790-66 |
| Elongation | % | ASTM D638-68 |
| Tear Strength | lbs/linear inch (kg/linear meter) | ASTM D62Y Die C |
| Heat Sag 250°/60 min. | inches (cm) of sag | 6MTZZZ006AA (General Motors) |
| Density | g/cc | ASTM D792 |

EXAMPLES 1-25 AND COMPARATIVE EXPERIMENTS A-C

These examples and comparative experiments were prepared by use of high pressure impingement mixing equipment employing one of the following type units: Admiral HP-40, Hennecke HK 245 or Krauss Maffei PU 80/40. Samples were molded in a heated polished steel mold forming a ⅛" thick sheet of polymer, demolded 60 sec. after injection. The polyol components were maintained at a temperature of 75°-140° F. (23.89°-60° C.). The isocyanate components were maintained at a temperature of from 75°-120° F. (23.89°-48.89° C.). The components were injected into the mold at a pressure of 1500-2500 psi (105.45-175.75 kg/cm$^2$). The injection rates varied from 25 lbs/min (11.34 kg/min) to 220 lbs/min (99.79 kg/min.). The mold temperatures varied from 125°-175° F. (51.67°-79.44° C.).

The components and physical properties are given in the following Table. The physical properties were obtained after the samples had been post cured at 250° F. (121.11° C.) for 60 minutes.

TABLE

| EXAMPLE OR COMP. EXPT. | CATA- | POLYOL | HYDROXYL- CONTAINING | AROMATIC AMINE CHAIN EXTENDER | ALIPHATIC AMINE CHAIN EXTENDER | ISOCYANATE | BLOWING AGENT |
|---|---|---|---|---|---|---|---|

TABLE-continued

| NUMBER | LYST type/parts | type/parts OH equiv. | CHAIN EXTENDER type/parts/OH equiv. | type/parts/ amine H equiv. | type/parts/ amine H equiv. | type/parts/ NCO equiv./index | type/ parts |
|---|---|---|---|---|---|---|---|
| Comp. Expt. A | A/0.18 | C/100/0.0424 | A/17/0.5484 | None | None | A/88.56/0.6193/1.05 | A/3.69 |
| Ex. 1 | A/0.19 | C/100/0.0424 | A/17/0.5484 | None | G/7.5/0.0750 | A/99.8/0.6979/1.05 | A/4.16 |
| Ex. 2 | A/0.2 | C/100/0.0424 | A/17/0.5484 | None | G/13.5/0.135 | A/108.8/0.7609/1.05 | A/4.53 |
| Ex. 3 | A/0.18 | C/100/0.0424 | A/17/0.5484 | None | E/4/0.1905 | A/106.02/0.7414/0.95 | A/4.42 |
| Ex. 4 | A/0.2 | C/100/0.0424 | A/17/0.5484 | None | G/13.5/0.135 E/2/0.0952 | A/117.12/0.8190/1.00 | A/4.88 |
| Ex. 5 | A/0.19 | C/100/0.0424 | A/15/0.4839 | None | I/14/0.2667 | A/98.93/0.6918/0.87 | — |
| Ex. 6 | A/0.23 | C/100/0.0424 | A/15/0.4839 | None | F/11/0.1642 | A/103.5/0.7238/1.05 | — |
| Ex. 7 | A/0.53 | D/100/0.0638 | A/8/0.2581 D/3/0.0448 | None | G/6/0.06 | A/64.06/0.4267/1.05 | — |
| Ex. 8 | A/0.72 | C/100/0.0424 | A/40/1.2903 | None | C/4/0.2667 | A/221.4/1.5483/0.97 | — |
| Ex. 9 | A/0.27 | C/100/0.0424 | A/17/0.5484 | None | G/13.5/0.135 J/3.25/0.0785 | A/117.5/0.8217/1.02 | — |
| Ex. 10 | A/0.26 | C/100/0.0424 | A/17/0.5484 | None | H/10/0.1739 | A/124.3/0.8692/1.01 | — |
| Ex. 11 | A/0.27 | E/100/0.0489 | A/17/0.5484 | None | G/13.5/0.135 E/2/0.0952 | A/118.7/0.8301/1.00 | — |
| Ex. 12 | A/0.31 | F/100/0.0556 | A/17/0.5484 | None | G/13.5/0.135 E/2/0.0952 | A/119.7/0.8371/1.00 | — |
| Ex. 13 | A/0.27 | C/100/0.0424 | A/17/0.5484 | K/6/0.1165 | G/13.5/0.135 | A/118.4/0.8280/0.98 | — |
| Ex. 14 | A/0.14 | C/100/0.0424 | A/17/0.5484 | K/9/0.1748 | G/13.5/0.135 | A/122.8/0.8587/0.95 | — |
| Ex. 15 | A/0.29 | C/100/0.0424 | A/17/0.5484 | K/12/0.2330 | G/13.5/0.135 | A/127.2/0.8895/0.93 | — |
| Ex. 16 | A/0.21 | C/100/0.0424 | A/13/0.4194 | L/14/0.2718 | G/10/0.100 | B/117.2/0.7371/0.88 | — |
| Ex. 17 | A/0.21 | C/100/0.0424 | A/13/0.4194 | L/14/0.2718 | G/12.5/0.125 | B/120.6/0.7585/0.88 | — |
| Ex. 18 | A/0.21 | C/100/0.0424 | A/13/0.4194 | L/14/0.2718 | G/15/0.150 | B/124.8/0.7849/0.89 | — |
| Ex. 19 | A/0.21 | C/100/0.0424 | A/13/0.4194 | L/14/0.2718 | G/15/0.150 | C/145.2/0.7849/0.89 | — |
| Ex. 20 | A/0.22 | C/100/0.0424 | A/15/0.4839 | L/14/0.2718 | G/15/0.150 | C/157.7/0.8524/0.90 | — |
| Ex. 21 | A/0.21 | C/100/0.0424 | A/13/0.4194 | L/14/0.2718 | G/10/0.100 | C/135.5/0.7324/0.88 | — |
| Comp. Expt. B | A/0.24 | C/100/0.0388 | A/19.3/0.6234 | None | None | A/99.7/0.6948/1.05 | A/2.4 |
| Comp. Expt. C | A/0.24 | C/100/0.0388 | A/21.2/0.6834 | None | None | A/108.8/0.7582/1.05 | A/2.4 |
| Ex. 22 | A/0.24 | C/100/0.0388 | A/21.2/0.6834 | None | G/31.5/0.315 | A/150.0/1.0769/1.04 | A/2.4 |
| Ex. 23 | A/0.26 | B/100/0.1000 | A/17.0/0.5484 | None | G/13.5/0.135 | A/121.9/0.8524/1.05 | — |
| Ex. 24 | A/0.41, B/0.14 | C/100/0.0424 | A/30.0/0.9677 | None | G/7.5/0.075 | A/162.9/1.1394/1.05 | — |
| Ex. 25 | A/0.26 | D/100/0.0638 | A/17.0/0.5484 | None | G/13.5/0.135 | A/115.6/0.8084/1.05 | — |

| EXAMPLE OR COMP. EXPT. NUMBER | WEIGHT % OF REACTION PRODUCT OF ALIPHATIC AMINE WITH ISOCYANATE | ELONGATION % | TENSILE STRENGTH psi | TENSILE STRENGTH (kg/cm²) | TEAR STRENGTH pli | TEAR STRENGTH (kg/m) | HEAT SAG 250° F. (121° C.) in. | HEAT SAG 250° F. (121° C.) (cm) | DENSITY g/cc |
|---|---|---|---|---|---|---|---|---|---|
| Comp. Expt. A | 0 | 480 | 2759 | (194) | 400 | (7,143) | 0.4 | (1.02) | 1.0 |
| Ex. 1 | 8.13 | 474 | 3258 | (229) | 720 | (12,857) | 0.35 | (0.89) | 1.11 |
| Ex. 2 | 13.71 | 400 | 2949 | (207) | 650 | (11,607) | 0.37 | (0.94) | 1.0 |
| Ex. 3 | 13.76 | 250 | 4076 | (287) | 700 | (12,500) | 1.0 | (2.54) | 1.13 |
| Ex. 4 | 13.19 | 333 | 3770 | (265) | 1034 | (18,464) | 2.7 | (6.86) | 1.18 |
| Ex. 5 | 22.87 | 133 | 3475 | (244) | 450 | (8,036) | 0.6 | (1.52) | 1.14 |
| Ex. 6 | 15.02 | 247 | 2932 | (206) | 603 | (10,768) | 0.5 | (1.27) | |
| Ex. 7 | 8.05 | 545 | 1800 | (127) | 325 | (5,804) | N.D.[1] | | 1.0 |
| Ex. 8 | 11.53 | 270 | 3996 | (281) | 827 | (14,768) | 0.25 | (0.64) | 1.055 |
| Ex. 9 | 18.82 | 273 | 3401 | (239) | 664 | (11,857) | 0.90 | (2.29) | 1.04 |
| Ex. 10 | 19.93 | 236 | 3901 | (274) | 802 | (14,321) | 0.3 | (0.76) | 1.15 |
| Ex. 11 | 19.27 | 212 | 3565 | (251) | 672 | (12,000) | 0.35 | (0.89) | 1.08 |
| Ex. 12 | 19.2 | 156 | 3961 | (278) | 728 | (13,000) | 0.07 | (0.18) | 1.07 |
| Ex. 13 | 12.87 | 311 | 3810 | (268) | 902 | (16,107) | 0.55 | (1.40) | 1.10 |
| Ex. 14 | 12.51 | 237 | 3619 | (254) | 826 | (14,750) | 0.3 | (0.76) | 1.11 |
| Ex. 15 | 1216 | 369 | 4456 | (313) | 895 | (15,982) | 0.58 | (1.47) | 1.15 |
| Ex. 16 | 10.19 | 116 | 4,278 | (301) | 643 | (11,482) | 0.05 | (0.13) | 1.108 |
| Ex. 17 | 12.45 | 119 | 4,348 | (306) | 673 | (12,018) | 0.15 | (0.38) | 1.109 |
| Ex. 18 | 14.56 | 128 | 4,368 | (307) | 566 | (10,107) | 0.07 | (0.18) | 1.108 |
| Ex. 19 | 14.88 | 108 | 4,614 | (324) | 724 | (12,928) | 0.41 | (1.05) | 1.119 |
| Ex. 20 | 14.17 | 111 | 4,942 | (347) | 809 | (14,446) | 0.31 | (0.8) | 1.125 |
| Ex. 21 | 10.46 | 130 | 4,619 | (325) | 725 | (12,946) | 0.39 | (1) | 1.117 |
| Comp. Expt. B | 0 | 650 | 2,244 | (158) | 540 | (9,643) | 0.51 | (1.30) | 1.000 |
| Comp. Expt. C | 0 | 571 | 2,336 | (164) | 544 | (9,714) | 0.47 | (1.19) | 0.970 |
| Ex. 22 | 25 | 330 | 3,463 | (243) | 602 | (10,750) | 0.99 | (2.51) | 0.999 |
| Ex. 23 | 13 | 302 | 3.871 | (272) | 647 | (11,553) | 1.25 | (3.18) | 1.132 |
| Ex. 24 | 6.07 | 288 | 4,265 | (300) | 720 | (12,857) | 0.18 | (0.46) | 1.104 |
| Ex. 25 | 13.33 | 331 | 3,402 | (239) | 665 | (11,875) | 0.75 | (1.91) | 1.119 |

| EXAMPLE OR COMP. EXPT. NUMBER | FLEXURAL MODULUS ROOM TEMPERATURE 73° F. (23° C.) psi | (kg/cm²) | −20° F. (−29° C.) psi | (kg/cm²) | 158° F. (70° C.) psi | (kg/cm²) | FACTOR −20° F./158° F. |
|---|---|---|---|---|---|---|---|

TABLE-continued

| | | | | | | | |
|---|---|---|---|---|---|---|---|
| Comp. Expt. A | 18,000 | (1,265) | N.D.[1] | | N.D. | | N.D. |
| Ex. 1 | 30,600 | (2,151) | 70,920 | (4,986) | 15,681 | (1,102) | 4.52 |
| Ex. 2 | 53,000 | (3,726) | 113,646 | (7,989) | 23,647 | (1,662) | 4.81 |
| Ex. 3 | 73,000 | (5,132) | 148,634 | (10,449) | 26,391 | (1,855) | 5.63 |
| Ex. 4 | 78,363 | (5,509) | 233,864 | (16,441) | 10,524 | (740) | 22.2 |
| Ex. 5 | 34,000 | (2,390) | 57,565 | (4,047) | 10,560 | (742) | 5.45 |
| Ex. 6 | 48,000 | (3,374) | 100,949 | (7,097) | 15,008 | (1,055) | 6.73 |
| Ex. 7 | N.D. | | N.D. | | N.D. | | N.D. |
| Ex. 8 | 81,184 | (5,707) | 129,954 | (9,136) | 53,014 | (3,727) | 2.45 |
| Ex. 9 | 50,522 | (3,551) | 96,775 | (6,803) | 23,068 | (1,622) | 4.2 |
| Ex. 10 | 67,358 | (4,735) | 130,365 | (9,165) | 27,839 | (1,957) | 4.68 |
| Ex. 11 | 78,178 | (5,496) | 172,663 | (12,138) | 32,199 | (2,264) | 5.36 |
| Ex. 12 | 96,894 | (6,812) | 172,334 | (12,115) | 42,822 | (3,010) | 4.02 |
| Ex. 13 | 80,076 | (5,629) | 140,165 | (9,854) | 29,155 | (2,050) | 4.81 |
| Ex. 14 | 72,766 | (5,115) | 125,331 | (8,811) | 30,566 | (2,149) | 4.10 |
| Ex. 15 | 67,342 | (4,734) | 122,854 | (8,637) | 21,477 | (1,510) | 5.72 |
| Ex. 16 | 74,598 | (5,244) | 110,149 | (7,743) | 48,012 | (3,375) | 2.29 |
| Ex. 17 | 76,101 | (5,350) | 122,599 | (8,619) | 45,418 | (3,193) | 2.7 |
| Ex. 18 | 78,476 | (5,517) | 120,785 | (8,491) | 45,029 | (3,166) | 2.68 |
| Ex. 19 | 119,942 | (8,432) | 179,978 | (12,652) | 67,521 | (4,747) | 2.67 |
| Ex. 20 | 140,035 | (9,844) | 201,473 | (14,164) | 64,566 | (4,539) | 3.12 |
| Ex. 21 | 104,446 | (7,343) | 167,166 | (11,752) | 51,955 | (3,652) | 3.22 |
| Comp. Expt. B | 16,764 | (1,179) | 35,928 | (2,526) | 7,897 | (555) | 4.55 |
| Comp. Expt. C | 20,172 | (1,418) | 46,838 | (3,293) | 10,283 | (723) | 4.55 |
| Ex. 22 | 48,217 | (3,390) | 113,195 | (7,958) | 12,151 | (854) | 9.32 |
| Ex. 23 | 23,111 | (1,625) | 69,162 | (4,862) | 8,966 | (630) | 7.7 |
| Ex. 24 | 132,755 | (9,333) | 210,580 | (14,804) | 77,520 | (5,450) | 2.7 |
| Ex. 25 | 37,657 | (2,647) | 112,582 | (7,915) | 15,184 | (1,067) | 7.4 |

[1]N.D. = Not determined.

We claim:

1. In a process for preparing RIM urethane systems which systems employ a composition which comprises (A) a relatively high molecular weight hydroxyl-containing polyol, (B) a chain extender and (C) a polyisocyanate, a polyisothiocyanate or mixture thereof; the improvement which comprises employing as the chain extender, component (B), a mixture comprising
    (1) at least one member selected from the group consisting of
        (a) hydroxyl-containing materials which are essentially free of aliphatic amine hydrogen atoms, have an average OH functionality of from about 2 to about 4 and have an average OH equivalent weight of from about 30 to about 120 and
        (b) aromatic amine-containing materials which are essentially free of aliphatic amine hydrogen atoms and which contain at least two aromatic amine hydrogen atoms and
    (2) at least one aliphatic amine-containing material having at least one primary amine group, an average aliphatic amine hydrogen functionality of from about 2 to about 16 and an average aliphatic amine hydrogen equivalent weight of from about 15 to about 500; and wherein
        (i) components (A), (B) and (C) are present in quantities such that the weight percent of the theoretical reaction product of the amine hydrogen atoms of component (B-2) with a stoichiometric quantity of component (C) based upon the total weight of Components (A), (B) and (C) is from about 5 to about 25 and
        (ii) the NCX index is from about 0.6:1 to about 1.50:1 with the proviso that when an NCX trimerization catalyst is also present the index is up to about 5:1.

2. The process of claim 1 wherein
    (i) component (B-2) is an aliphatic amine-containing material having an average aliphatic amine hydrogen functionality of from about 2 to about 12 and an average aliphatic amine hydrogen equivalent weight of from about 50 to about 200;
    (ii) component (B-1-a) has an average hydroxyl functionality of from about 2 to about 3 and an average hydroxyl equivalent weight of from about 30 to about 70;
    (iii) component A is a polyether polyol having an average hydroxyl functionality of from about 2 to about 8 and an average hydroxyl equivalent weight of from about 500 to about 5000;
    (iv) component C is a polyisocyanate;
    (v) NCO index is from about 0.7:1 to about 1.25:1, and
    (vi) the weight % of said theoretical reaction product is from about 6 to about 20.

3. The process of claim 2 wherein
    (i) component (A) has an average functionality of from about 2 to about 4 and an average hydroxyl equivalent weight of from about 1000 to about 3000;
    (ii) component (B-2) has an average aliphatic amine hydrogen functionality of from about 4 to about 8 and an average aliphatic amine hydrogen equivalent weight of from about 80 to about 150;
    (iii) component (B-1-a) has an average hydroxyl functionality of about 2 and an average hydroxyl equivalent weight of from about 30 to about 50;
    (iv) the NCO index is from about 0.8:1 to about 1.10:1; and
    (v) the weight % of said theoretical reaction product is from about 6 to about 16.

4. The process of claim 3 wherein component A has an average hydroxyl functionality of from about 2 to about 3 and an average hydroxyl equivalent weight of from about 1500 to about 2500.

5. The process of claims 1, 2, 3 or 4 wherein
    (i) component (A) is a polyoxyalkylene glycol or a glycerine or trimethylolpropane initiated polyoxyalkylenepolyol;

(ii) component (B-1-a) is ethylene glycol, diethylene glycol, propylene glycol, dipropylene glycol or 1,4-butene diol;

(iii) component (B-1-b) is a polyphenylpolyamine having a functionality of from 2 to about 5, 1-methyl-3,5-diethyl-2,4-diaminobenzene, 3,5,3′,5′-tetraethyl-4,4′-diaminodiphenylmethane, or mixtures thereof;

(iv) component (B-2) is an aminated polyoxypropylene glycol having an average amine hydrogen equivalent weight of from about 60 to about 110;

(v) component (C) is a liquid, modified diphenylmethane diisocyanate, prepolymers thereof and mixtures of the above and wherein the average NCO equivalent weight is from about 140 to about 200.

* * * * *

UNITED STATES PATENT AND TRADEMARK OFFICE
CERTIFICATE OF CORRECTION

PATENT NO. : 4,269,945

DATED : May 26, 1981

INVENTOR(S) : James A. Vanderhider, Gerald M. Lancaster

It is certified that error appears in the above-identified patent and that said Letters Patent are hereby corrected as shown below:

Column 1, line 48, change "the" to --an--.

Column 3, line 22, add --;-- after "quinitol".

Column 12, line 42 add --the--before "NCO".

Column 13, line 3 change "butene" to --butane--.

Signed and Sealed this

Sixth Day of October 1981

[SEAL]

Attest:

GERALD J. MOSSINGHOFF

*Attesting Officer*   *Commissioner of Patents and Trademarks*